No. 883,726. PATENTED APR. 7, 1908.
C. P. LEYNER.
MACHINE FOR MEASURING AND CUTTING SKIRTS.
APPLICATION FILED JUNE 21, 1907.
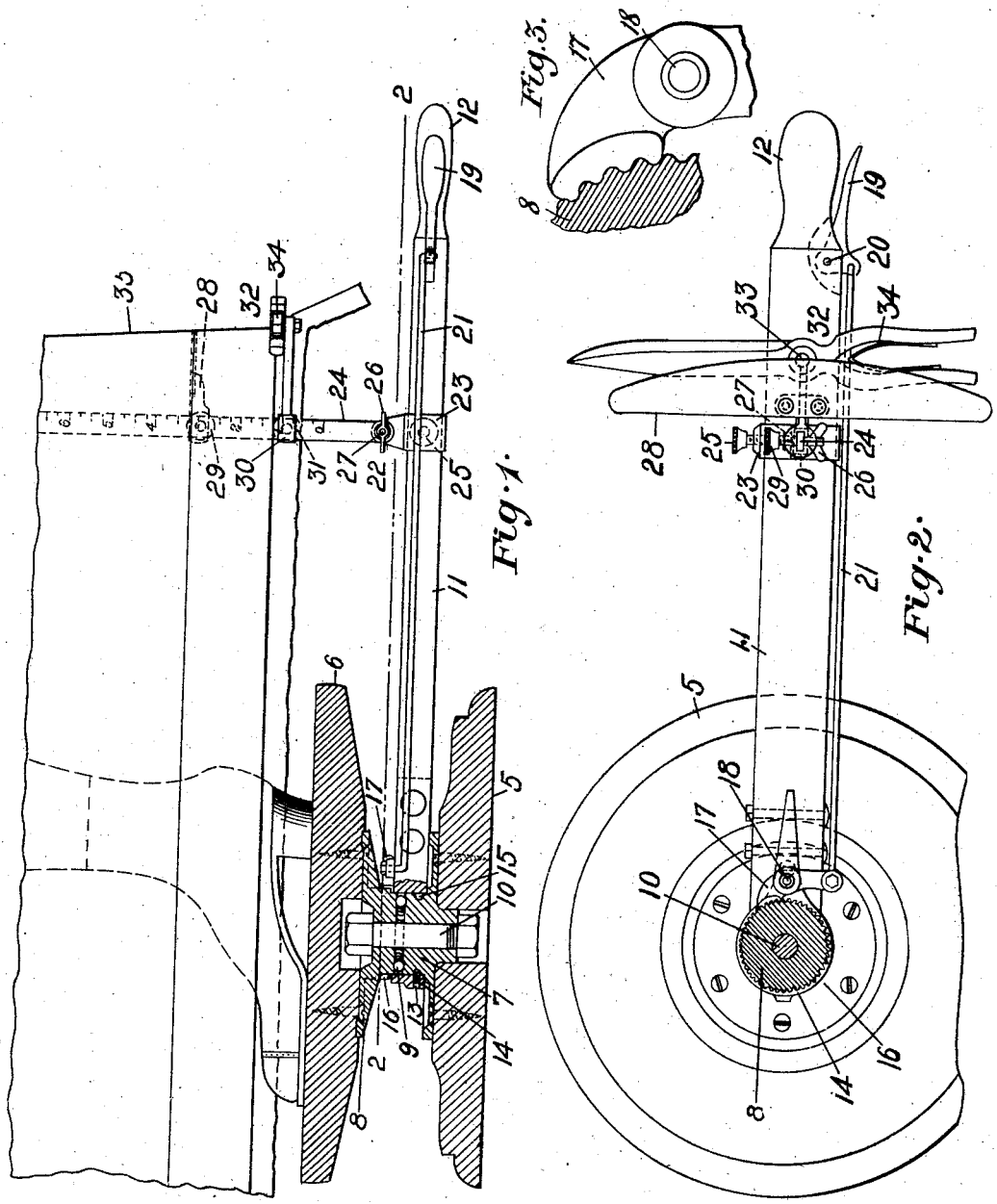
Witnesses:
Inventor:

UNITED STATES PATENT OFFICE.

CHARLES P. LEYNER, OF BOSTON, MASSACHUSETTS.

MACHINE FOR MEASURING AND CUTTING SKIRTS.

No. 883,726.          Specification of Letters Patent.          Patented April 7, 1908.

Application filed June 21, 1907. Serial No. 380,059.

*To all whom it may concern:*

Be it known that I, CHARLES P. LEYNER, a citizen of the United States, residing at Boston, in the county of Suffolk and State of Massachusetts, have invented new and useful Improvements in Machines for Measuring and Cutting Skirts, of which the following is a specification.

This invention relates to improvements in machines for measuring and cutting skirts, and the object is first, to provide a machine by means of which the length of a skirt may be conveniently and accurately measured and a line scribed around it, and second, to provide a machine by means of which a skirt may be conveniently cut to the proper length while on the form of the wearer or on a model supported on the machine.

The invention consists in the combination and arrangement of parts set forth in the following specification and particularly pointed out in the appended claims.

Referring to the drawings: Figure 1 is a vertical sectional elevation of the machine showing the same in use. Fig. 2 is a plan section, partly broken away, taken on line 2—2 of Fig. 1. Fig. 3 is an enlarged detail plan section of a portion of the pawl and ratchet.

In the drawings, 5 is a base on which a pedestal 6 is mounted to rotate about a vertical axis. A plate 7 is fast to the base 5 while a plate 8 is fast to the pedestal 6, there being a plurality of balls 9 interposed between said plates, said balls and said plates constituting a ball bearing. A pivotal pin or bolt 10 extends through the plates 7 and 8. An arm 11 provided with a handle 12 is journaled on the plate 7, there being a screw 13 having screw-threaded engagement with the hub 14 of the arm 11, said screw extending into an annular groove 15 formed in the plate 7. The plate 8 is provided with a plurality of teeth 16 which are preferably symmetrical in form. These teeth I prefer to form semi-circular on the top and bottom, that is, the plate 8 with the teeth 16 thereon constitutes a ratchet. A pawl 17 is pivoted at 18 to the arm 11, said pawl being provided with a plurality of teeth identical with those on the plate 8.

A lever 19 pivoted at 20 to the arm 11 is connected to the pawl 17 by a link 21. A support 22 comprises a collar 23 slidably mounted on the arm 11 and a rod 24 pivotally mounted on said collar, there being a set screw 25 by means of which the collar 23 may be clamped in any desired position on the arm 11, while a thumb nut 26 having screw-threaded engagement with a bolt 27 is adapted to clamp the rod 24 in the desired angular relation to the arm 11. The rod 24 is preferably provided with graduations which constitute a scale, the zero mark of said scale lying in the same plane as the upper surface of the pedestal 6. A gage 28 is slidably mounted on the rod 24, there being a set screw 29 having screw-threaded engagement with said gage, said set screw being adapted to clamp said gage in any desired position on the rod 24. A bracket 30 is adjustably mounted on the rod 24, said bracket being secured to said rod by means of a set screw 31. A pair of shears 32 is mounted on the bracket 30, the pivotal pin 33 of said shears passing through said bracket and securing said shears to said bracket. The shears 32 may be provided with a spring 34.

The general operation of the machine hereinbefore specifically described is as follows: The skirt to be measured and cut may be placed either on the woman or on a model, as may be desired. The woman stands on the pedestal 6 and the inside of the skirt 35 hangs against the gage 28, as shown in Fig. 1. If it be desired to make the skirt clear the ground by three inches the tailor places the gage 28 at three inches and with a piece of tailor's chalk marks a line on the outside of the skirt pressing the skirt against the gage 28 while doing so. The tailor then grasps the handle 12 and lever 19 thereby moving the pawl 17 into engagement with the ratchet teeth and by rocking the arm 11 on its pivot rotates the pedestal 6 the desired distance and thus continues to scribe a line around the skirt by rotating the pedestal 6 from time to time as the marking proceeds. It will be seen that owing to the form of the teeth of the ratchet and pawl the pedestal 6 may be rotated in either direction at will or stopped in any position. If it be desired to leave three inches of the skirt to be turned up to form the hem the tailor moves the bracket 30 to the proper position so that the cutting edges of the shears 32 will occupy their correct position with relation to the line previously marked upon the skirt 35 and the tailor then cuts said skirt by means of said shears rotating the pedestal 6 from time to time as the operation of cutting proceeds. The rod 24 when not in use may be folded down against said arm. It will be seen that owing to the fact that the tailor is not obliged to move around the skirt while doing the marking and cutting that the work may be done much more conveniently than would be the case if he were obliged to do so and furthermore, the work can be more conveniently done than would be possible if the person were obliged to turn around during the operation of marking and cutting.

Having thus described my invention, what I claim and desire by Letters Patent to secure is:

1. In a machine of the character described, a stationary base, a pedestal mounted on said base to rotate about a vertical axis, means to intermittently rotate said pedestal, said means comprising a horizontal arm, and a gage supported on said arm.

2. In a machine of the character described, a stationary base, a pedestal mounted on said base to rotate about a vertical axis, means to intermittently rotate said pedestal, said means comprising a horizontal arm, a support adjustably mounted on said arm to be moved toward and away from said axis, and a gage mounted on said support.

3. In a machine of the character described, a stationary base, a pedestal mounted on said base to rotate about a vertical axis, means to intermittently rotate said pedestal, said means comprising a horizontal arm, a support adjustably mounted on said arm to be moved toward and away from said axis, and a gage adjustably mounted on said support to be moved vertically.

4. In a machine of the character described, a stationary base, a pedestal mounted on said base to rotate about a vertical axis, means to intermittently rotate said pedestal, said means comprising a horizontal arm, and a pair of shears supported on said arm.

5. In a machine of the character described, a stationary base, a pedestal mounted on said base to rotate about a vertical axis, means to intermittently rotate said pedestal, said means comprising a horizontal arm, a support mounted on said arm, and a pair of shears adjustably mounted on said support to be moved vertically.

6. In a machine of the character described, a stationary base, a pedestal mounted on said base to rotate about a vertical axis, means to intermittently rotate said pedestal, said means comprising a horizontal arm, a collar adjustably mounted on said arm to be moved toward and away from said axis, a rod pivotally mounted on said collar, and a gage vertically adjustable on said rod.

7. In a machine of the character described, a stationary base, a pedestal mounted on said base to rotate about a vertical axis, means to intermittently rotate said pedestal, said means comprising a horizontal arm, a collar adjustably mounted on said arm to be moved toward and away from said axis, a rod pivotally mounted on said collar, and a pair of shears supported on said rod.

8. In a machine of the character described, a stationary base, a pedestal mounted on said base to rotate about a vertical axis, means to intermittently rotate said pedestal, said means comprising a horizontal arm, a collar adjustably mounted on said arm to be moved toward and away from said axis, a rod mounted on said collar, a bracket adjustably mounted on said rod to be moved vertically, and a pair of shears pivotally mounted on said bracket.

9. In a machine of the character described, a stationary base, a pedestal mounted on said base to rotate about a vertical axis, an arm pivoted to swing about said axis, a gage supported on said arm, a ratchet fast to said pedestal, and a pawl supported on said arm and adapted to operatively engage said ratchet.

10. In a machine of the character described, a stationary base, a pedestal mounted on said base to rotate about a vertical axis, an arm pivoted to swing about said axis, a gage supported on said arm, a ratchet fast to said pedestal, a pawl supported on said arm and adapted to operatively engage said ratchet, a lever pivotally mounted on said arm, and a link connected to said pawl and said lever.

11. In a machine of the character described, a stationary base, a pedestal mounted on said base to rotate about a vertical axis, an arm pivoted to swing about said axis, a support adjustably mounted on said arm to be moved toward and away from said axis, a gage mounted on said support, a ratchet fast to said pedestal, and a pawl supported on said arm and adapted to operatively engage said ratchet.

12. In a machine of the character described, a stationary base, a pedestal mounted on said base to rotate about a vertical axis, an arm pivoted to swing about said axis, a gage supported on said arm, a ratchet fast to said pedestal, said ratchet being provided with symmetrical teeth, a pawl supported on said arm and adapted to engage said ratchet, said pawl being provided with symmetrical teeth, and means to move said pawl into and out of engagement with said ratchet.

In testimony whereof I have hereunto set my hand in presence of two subscribing witnesses.

CHARLES P. LEYNER.

Witnesses:
 LOUIS A. JONES,
 SADIE V. MCCARTHY.